(12) United States Patent
Suto et al.

(10) Patent No.: US 12,552,106 B2
(45) Date of Patent: Feb. 17, 2026

(54) AUTONOMOUS FILAMENT SELECTION FOR MULTIDIMENSIONAL PRINTERS

(71) Applicant: INTERNATIONAL BUSINESS MACHINES CORPORATION, Armonk, NY (US)

(72) Inventors: Tiberiu Suto, Franklin, NY (US); Jessica Nahulan, Markham (CA); Jeremy R. Fox, Georgetown, TX (US); Carolina Garcia Delgado, Zapopan (MX)

(73) Assignee: International Business Machines Corporation, Armonk, NY (US)

(*) Notice: Subject to any disclaimer, the term of this patent is extended or adjusted under 35 U.S.C. 154(b) by 420 days.

(21) Appl. No.: 18/179,412

(22) Filed: Mar. 7, 2023

(65) Prior Publication Data
US 2024/0300182 A1    Sep. 12, 2024

(51) Int. Cl.
*B29C 64/393* (2017.01)
*B29C 64/118* (2017.01)
*B33Y 50/02* (2015.01)

(52) U.S. Cl.
CPC .......... *B29C 64/393* (2017.08); *B29C 64/118* (2017.08); *B33Y 50/02* (2014.12)

(58) Field of Classification Search
CPC ... B29C 64/393; B29C 64/118; B29C 64/386; B33Y 50/02; B33Y 10/00; B33Y 50/00
See application file for complete search history.

(56) References Cited

U.S. PATENT DOCUMENTS

| | | | |
|---|---|---|---|
| 9,895,845 B2 | 2/2018 | Bheda et al. | |
| 11,106,193 B1 | 8/2021 | Shen et al. | |
| 11,285,673 B2 | 3/2022 | Nilakantan | |
| 2010/0327479 A1* | 12/2010 | Zinniel | B29C 64/106 425/114 |
| 2016/0236416 A1 | 8/2016 | Bheda et al. | |
| 2017/0190108 A1* | 7/2017 | Holland | B33Y 10/00 |
| 2020/0282641 A1 | 9/2020 | Kai et al. | |

(Continued)

FOREIGN PATENT DOCUMENTS

| | | |
|---|---|---|
| EP | 3542992 B1 | 3/2021 |
| KR | 102100061 B1 | 4/2020 |

OTHER PUBLICATIONS

"3D and 4D Technology Market Size, Key Players, Revenue, Share, Future Trends, Growth and Forecast 2003", Marketwatch, https://www.marketwatch.com/press-release/3d-and-4d-technology-mar . . ., Dec. 6, 2022, pp. 1-8.

(Continued)

*Primary Examiner* — Zhipeng Wang
(74) *Attorney, Agent, or Firm* — Jeffrey M. Ingalls (57) ABSTRACT

Provided is a method of autonomous filament selection for multidimensional printers. The method includes obtaining multimedia associated with multidimensional prints and constituent filaments. The obtained multimedia is analyzed to extract multidimensional print features, filament features, and user feedback for at least some of the multidimensional prints and at least some of the constituent filaments. The extracted multidimensional print features, filament features, and user feedback are mapped. At least one filament is selected for a new multidimensional print based on a plurality of user desired multidimensional print features.

20 Claims, 3 Drawing Sheets

(56) References Cited

U.S. PATENT DOCUMENTS

| | | |
|---|---|---|
| 2021/0178697 A1 | 6/2021 | Nilakantan |
| 2021/0247737 A1 | 8/2021 | Shen et al. |
| 2022/0172208 A1 | 6/2022 | Cella et al. |
| 2023/0211561 A1* | 7/2023 | Agarwal ................ B33Y 50/00 700/98 |
| 2025/0108563 A1* | 4/2025 | Euan Waldestrand ....................... B33Y 50/00 |

OTHER PUBLICATIONS

"What is 3D Printer Filament?", Raise 3D Academy, <https://www.raise3d.com/academy/what-is-3d-printer-filament/>, accessed Dec. 15, 2022, pp. 1-10.

Gardner et al., "Machines as craftsmen: Localized parameter setting optimization for fused Filament fabrication 3d printing", Advanced Materials Technologies, 2019, 4(3), Article 1800653, <https://austinebel.net/data/machines_as_craftsmen.pdf>, doi:10.1002/admt.201800653, pp. 1-10.

IBM, "Shifting Transport Paradigms", https://www.ibm.com/thought-leadership/institute-business-value/en-us . . . , accessed Dec. 15, 2022, pp. 1-6.

Koci, Jakub, "Advanced filament guide", Original Prusa 3D Printers, https://blog.prusa3d.com/advanced-filament-guide_39718/, Oct. 22, 2020, pp. 1-17.

Rubeck, Eric, "3d Printer Designs", https://www.pinterest.com/pin/3d-printing-filament-comparison--6492 . . . , accessed Dec. 15, 2022, pp. 1-2.

\* cited by examiner

AUTONOMOUS FILAMENT SELECTION FOR MULTIDIMENSIONAL PRINTERS

BACKGROUND

Exemplary embodiments of the present inventive concept relate to filament selection for multidimensional printers, and more particularly, to autonomous filament selection for multidimensional printers.

The global 3D and 4D Technology market is forecast to reach $931.17 billion by 2030 with a compound annual growth rate (CAGR) of 13.8% between 2021 to 2030. Multidimensional (e.g., 3D and 4D) printers are accelerating in popularity, and are increasingly used in both commercial and consumer contexts. Multidimensional prints can have a wide variety of purposes for creation (e.g., functional tools, machine components, artwork, etc.). These multidimensional prints can involve the cooperative incorporation of multiple filaments, necessary stepwise processes, cost constraints, requisite multidimensional printer types, and/or extruders. In addition, an enormous array of different filaments exist, each of which may possess a unique material profile (e.g., strength, material, difficulty-of-use, print temperature, warping, solubility, food safety, color, cost, etc.) and suitability depending on a purpose for creation of a multidimensional print.

SUMMARY

According to an exemplary embodiment of the present inventive concept, a method of autonomous filament selection for multidimensional printers is provided. The method includes obtaining multimedia associated with multidimensional prints and constituent filaments. The obtained multimedia is analyzed to extract multidimensional print features, filament features, and user feedback for at least some of the multidimensional prints and at least some of the constituent filaments. The extracted multidimensional print features, filament features, and user feedback are mapped. At least one filament is selected for a new multidimensional print based on a plurality of user desired multidimensional print features.

According to an exemplary embodiment of the present inventive concept, a computer program product for autonomous filament selection for multidimensional printers is provided. The computer program product comprising one or more computer-readable storage media and program instructions stored on the one or more non-transitory computer-readable storage media capable of performing a method. The method includes obtaining multimedia associated with multidimensional prints and constituent filaments. The obtained multimedia is analyzed to extract multidimensional print features, filament features, and user feedback for at least some of the multidimensional prints and at least some of the constituent filaments. The extracted multidimensional print features, filament features, and user feedback are mapped. At least one filament is selected for a new multidimensional print based on a plurality of user desired multidimensional print features.

According to an exemplary embodiment of the present inventive concept, a computer system for autonomous filament selection for multidimensional printers is provided. The computer system includes one or more computer processors, one or more computer-readable storage media, and program instructions stored on the one or more of the computer-readable storage media for execution by at least one of the one or more processors capable of performing a method. The method includes obtaining multimedia associated with multidimensional prints and constituent filaments. The obtained multimedia is analyzed to extract multidimensional print features, filament features, and user feedback for at least some of the multidimensional prints and at least some of the constituent filaments. The extracted multidimensional print features, filament features, and user feedback are mapped. At least one filament is selected for a new multidimensional print based on a plurality of user desired multidimensional print features.

BRIEF DESCRIPTION OF THE DRAWINGS

The following detailed description, given by way of example and not intended to limit the exemplary embodiments solely thereto, will best be appreciated in conjunction with the accompanying drawings, in which.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

The present inventive concept provides for a method, system, and computer program product for autonomous filament selection for multidimensional printers. As mentioned above, multidimensional printing involves logistical complexities and an enormous array of different filament options, each of which possess a unique material profile. The optimal filament(s) for a multidimensional print is highly dependent on a constellation of user desired features, such as intended category of use, color, and maximum cost. Users of multidimensional printers are ill equipped to make nuanced, multifactorial discernments between filament(s) for a multidimensional print. The present inventive concept leverages AI processes to autonomously optimize filament selection based on desired features for a multidimensional print input by the user.

Figure 1:
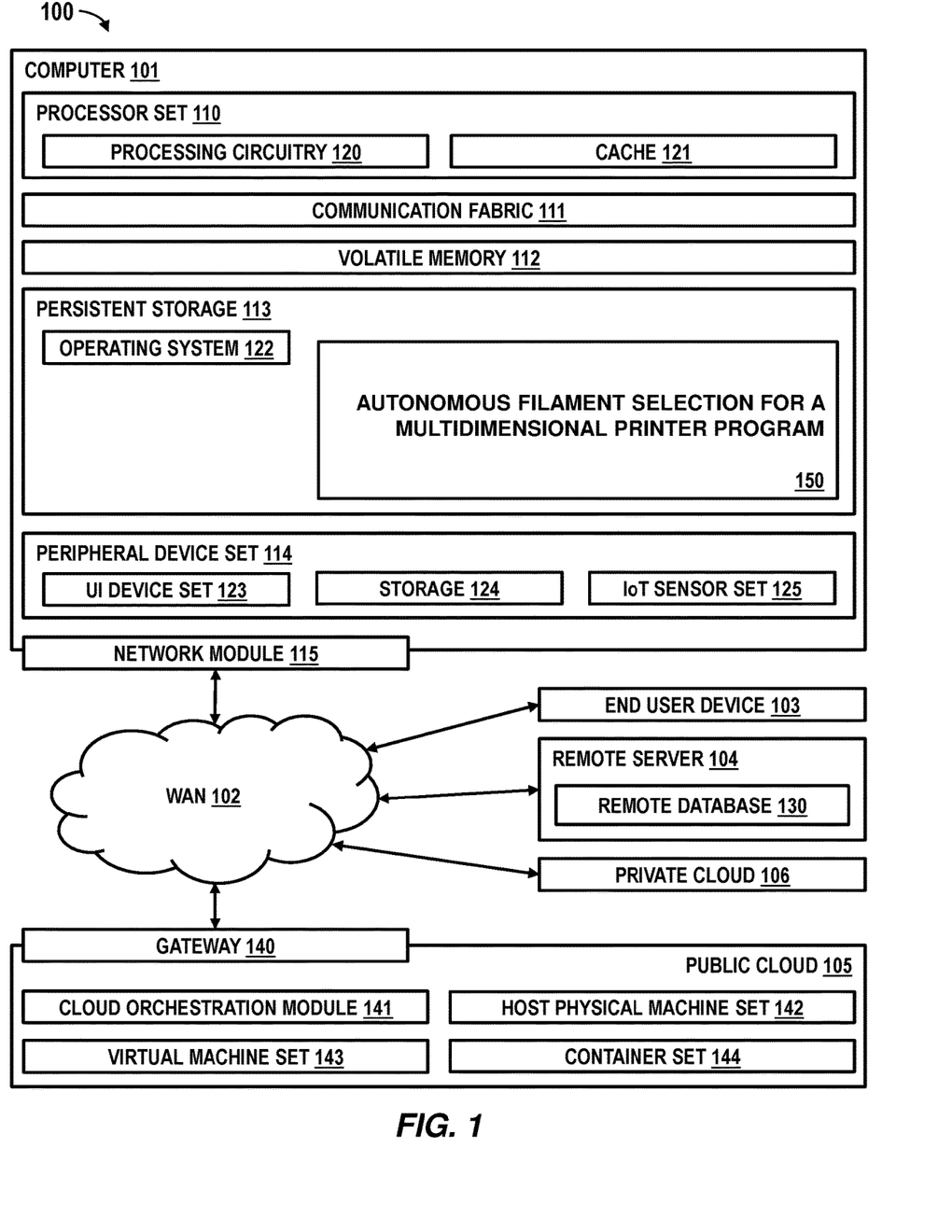
FIG. 1 illustrates a schematic diagram of computing environment 100 including an autonomous filament selection for a multidimensional printer program 150, in accordance with an exemplary embodiment of the present inventive concept.

FIG. 1 illustrates a schematic diagram of computing environment 100 including an autonomous filament selection for multidimensional printers program 150, in accordance with an exemplary embodiment of the present inventive concept.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as an autonomous filament selection for multidimensional printers program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
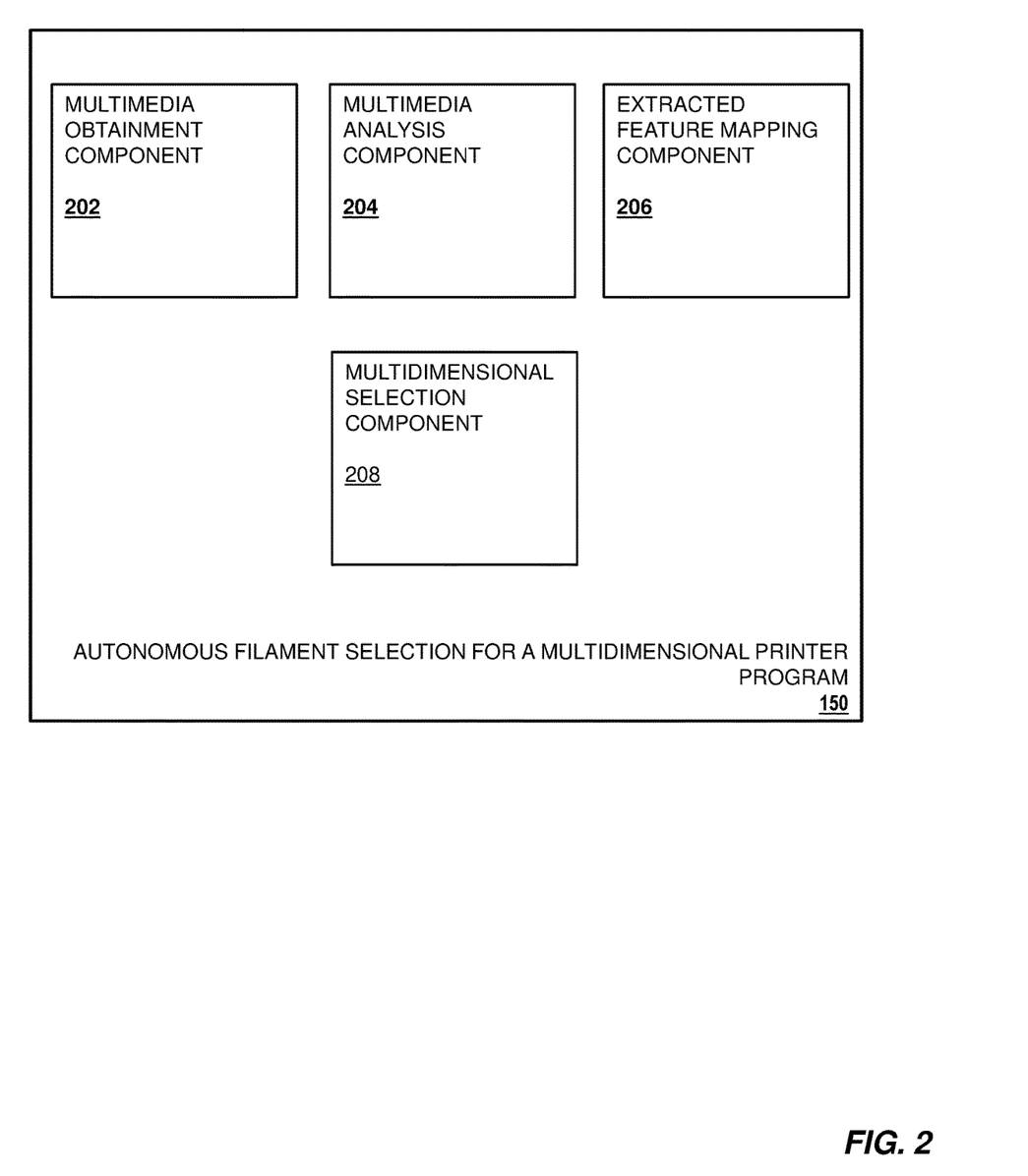
FIG. 2 illustrates a block diagram of components included in the autonomous filament selection for a multidimensional printer program 150, in accordance with an exemplary embodiment of the present invention.

FIG. 2 illustrates a block diagram of components included in an autonomous filament selection for multidimensional printers program 150, in accordance with an exemplary embodiment of the present invention.

The multimedia obtainment component 202 can obtain multimedia associated with multidimensional prints (e.g., 3D and/or 4D prints), multidimensional printers (e.g., those used to generate corresponding multidimensional prints), and filaments (e.g., constituent filaments of the multidimensional prints). The obtained multimedia can be obtained from the input of at least one user (e.g., crowd sourced) and/or autonomously retrieved over a network. Autonomously obtained multimedia can be obtained by a targeted search (e.g., by category, reference model, use, name, features, etc.) of a relevant repository (e.g., a database, website, manual, catalog, etc.). The obtained multimedia associated with the multidimensional prints, multidimensional printers, and/or constituent filaments can include at least one of relevant audio, text, graphics, animations, and videos. The obtained multimedia can include, but is not limited to, user feedback (e.g., surveys, reviews, scores, etc.), descriptive content (e.g., manuals, profiles, instructions, tutorials), and charts/graphs (e.g., attribute comparisons of options), etc.

For example, the multimedia obtainment component 202 autonomously accesses a multidimensional print community website. The multimedia obtainment component 202 retrieves multidimensional models/CAD drawings, corresponding used/suggested filaments, used/suggested multidimensional printers, and any respective reviews which were uploaded by crowdsourcing. In addition, the multimedia component 202 obtains used/suggested filament material and multidimensional printer profiles from respective manufacturer websites.

The multimedia analysis component 204 can analyze the obtained multimedia for various features (e.g., multidimensional print features, user feedback features, used/suggested multidimensional printer features, used/suggested multidimensional filament features, etc.) using applicable AI processes (e.g., computer vision, natural language processing (NLP), speech-to-text, etc.). The extracted multidimensional print features can include a multidimensional printer type used/suggested, a multidimensional print category, a multidimensional print intended use, a multidimensional print structure (e.g., dimensions, component parts/regions, curvatures, proportions, geometry, stages of creation, etc.), a multidimensional print overall cost, etc. The extracted filament features can include a constituent (e.g., suggested or used) filament cost, requisite multidimensional printer type(s), a filament strength, a filament difficulty-of-use, a filament print temperature, a filament durability, a filament solubility, a filament food safety, a filament color(s), etc. Extracted user feedback features can include numerical scores, popularity, NLP sentiments of written descriptions (e.g., parsed criticisms or endorsements of multidimensional printers, multidimensional prints, and/or used/suggested filaments), longevity, expectations, etc. The multimedia analysis component 204 can periodically refresh obtained multimedia and detect updates. In an embodiment of the present inventive concept, the multimedia analysis component 204 can identify latent (e.g., predicted) problems that may arise due to deficiencies in a used/suggested filament versus the structure, intended use, and/or category. In another embodiment, the multimedia analysis component 204 may run simulations of physical and/or chemical exposures inherent in an identified use and/or category and determine the adequacy of used/suggested filaments. The multimedia analysis component may also compare used/suggested filaments for multidimensional prints in the same or similar categories and/or uses.

For example, the multimedia analysis component 204 analyzes medical tools, sculptures, and mechanical parts included in the obtained multimedia. The multimedia analysis component 204 extracts names (e.g., scalpel, celebrity sculpture bust, muffler, etc.) categories (e.g., functional tool, artwork, mechanical part, etc.), intended uses, reviews, dimensions, proportions, used/suggested filaments, and used/suggested multidimensional printers. The multimedia analysis component identifies that the material used for the muffler is different than typically used/suggested for cart parts, and based on predicted physical forces, would be expected to eventually crack in under a year.

The extracted feature mapping component 206 can map the multidimensional print features, user feedback features, used/suggested multidimensional printer features, and used/suggested multidimensional filament features, etc. in a multifactorial matrix. Using the multifactorial matrix, the extracted feature mapping component can create complex constellations of extracted features that can be used to train an associated autonomous multidimensional print filament selection model. In an embodiment, the extracted feature mapping component can map structural similarities, map categories, and/or intended uses according to identified similarities.

For example, the extracted feature mapping component 206 can determine not only overtly similar matches, but overall composite mapped similarity analogs (for the purposes of filament selection), such as between a drone part and a car muffler, a celebrity sculpture bust and an abstract sculpture, and a surgical tool and a bread knife.

The multidimensional selection component 208 can receive input user desired features, user filament inventories (e.g., filaments, multidimensional printers, etc.), user multidimensional printer equipped filaments, and/or a multidimensional model and propose a ranked list of filaments, including an optimal selection, based on the mapped extracted features. The user may approve or override the optimal filament selection. The ranked list of identified filaments can include corresponding multidimensional prints, annotations with explanations detailing the pros and cons of each identified filament, and/or comparative tables/graphs/charts. The pros and cons of the identified filaments may include filament related structural vulnerabilities, model related structural vulnerabilities, prior user feedback, a predicted period of structural longevity, satisfaction of user desired features, suitability for a category and/or intended use, potential compromises or enhancements in user desired features, etc. In an embodiment, the multidimensional selection component 208 can determine a plurality of optimal filaments based on combination compatibility, maximization of overall user desired features (e.g., combining cheap and expensive filaments), print stages, and/or regions of a multidimensional model.

For examples:

1. Jesse is printing an abstract sculpture for a university art class and uploads a 3D model to the multidimensional selection component 208. The multidimensional selection component 208 identifies the 3D model as an abstract sculpture. Jesse's input desired features are as follows: any color, ≤$300 cost, at least low durability, and high model fidelity. The multidimensional selection component 208 identifies popular filaments used to print similar objects, such as the celebrity sculpture bust. However, the abstract sculpture does not need to have the durability of the celebrity sculpture bust, nor does it have a comparable degree of fine detail. The multidimensional selection component 208 also identifies a modern and ornate coat tree with similar curvatures and dimensions with a filament that is cheaper and lighter than that which is used for the celebrity sculpture bust. The multidimensional selection component 208 selects the filament used in the ornate coat tree as the optimal choice with a distinguishing explanation including the pros and cons of each identified filament. However, the multidimensional selection component 208 does not detect either of the top filament options currently fitted onto the connected 3D printer. It presents Jesse with options of available filaments which might be sub-optimal with corresponding explanation. Fortunately, Jesse is excited to see that the multidimensional selection component determines that the top selected filament is in her inventory and available to be switched into the 3D printer. Jesse does so, and then proceeds with the 3D print of the abstract sculpture with a great outcome, albeit mild fragility.

2. A local hospital needs to use their institutional 3D printer to create an important surgical tool that is in low supply and on back-order. The color of the surgical tool is irrelevant, however, a precise match in design, durability, alignment of layers, and safety of the material is required. The 3D print model of the surgical tool is matched with other similar and identical surgical tools. Popular filaments used by other hospitals to print these items are identified in ranked order of suggestion. The hospital already has the optimal filament identified available. The user approves the optimal filament for selection, and the 3D print of the urgently needed surgical tool commences.

3. Hank works for a local drone vendor. Hank needs to print some spare drone parts after a drone was damaged in a collision with a tree branch. Hank, a mechanical engineer, notices that the previous drone parts (which used an optimal filament selection) had vulnerable points within the design. Hank determines that printing the drone parts using a different, more shock absorbent filament might yield a higher quality (stronger) object/product with minimal downside to aerodynamics. Hank prioritizes durability, structure fidelity, and a maximum weight as vital user desired criterion. Hank overrides the autonomous filament selection in favor of the new filament. The drone part printed using the new filament performs flawlessly. After a predetermined period without negative user feedback, the overridden filament is added as a new optimal filament for the same drone part.

Figure 3:
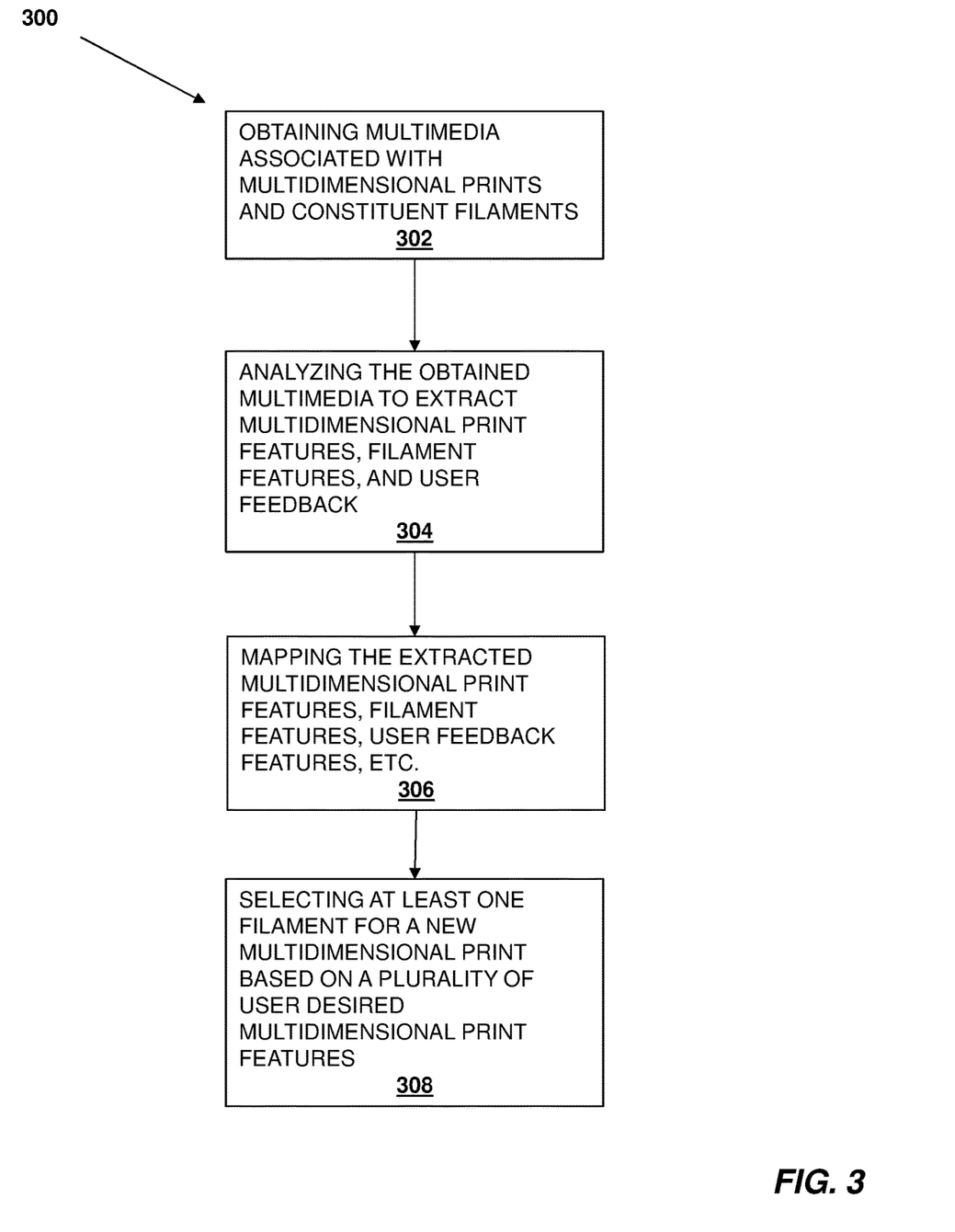
FIG. 3 illustrates a flowchart of autonomous filament selection for a multidimensional printer 300, in accordance with an exemplary embodiment of the present inventive concept.

FIG. 3 illustrates a flowchart of autonomous filament selection for a multidimensional printer 300, in accordance with an exemplary embodiment of the present inventive concept.

The autonomous filament selection for a multidimensional printer program 150 may obtain multimedia associated with multidimensional prints and constituent filaments (step 302) via the multimedia obtainment component 202.

The autonomous filament selection for a multidimensional printer program 150 may analyze the obtained multimedia to extract multidimensional print features, filament features, and user feedback for at least some of the multidimensional prints and at least some of the constituent filaments (step 304) using the multimedia analysis component 204.

The autonomous filament selection for a multidimensional printer program 150 may map the extracted multidimensional print features, filament features, and user feedback (step 306) using the extracted feature mapping component 206.

The autonomous filament selection for a multidimensional printer program 150 may select at least one filament for a new multidimensional print based on a plurality of user desired multidimensional print features (step 308) using the multidimensional selection component 208.

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

The invention claimed is:

1. A method of autonomous filament selection for multidimensional printers, the method comprising:
    obtaining multimedia associated with multidimensional prints and constituent filaments;
    analyzing the obtained multimedia to extract multidimensional print features, filament features, and user feedback for at least some of the multidimensional prints and at least some of the constituent filaments;
    mapping the extracted multidimensional print features, filament features, and user feedback into a multifactorial matrix;
    creating complex constellations of extracted features using the multifactorial matrix;
    training an associated autonomous multidimensional print filament selection model using the complex constellations; and
    generating, with the trained multidimensional print filament selection model, a ranked list of filaments, the ranked list including explanations of pros and cons associated with each filament; and
    selecting at least one filament for a new multidimensional print based on the ranked list of filaments and a plurality of user desired multidimensional print features.

2. The method of claim 1, wherein the extracted multidimensional print features include at least one of a multidimensional printer type used, a multidimensional print category, a multidimensional print intended use, a multidimensional print structure, and a multidimensional print overall cost.

3. The method of claim 1, wherein the extracted filament features include at least one of a constituent filament cost, requisite multidimensional printer types, a filament strength, a filament difficulty-of-use, a filament print temperature, a filament durability, a filament solubility, a filament food safety, and a filament color.

4. The method of claim 1, wherein the user desired multidimensional print features include at least one of an input multidimensional print category, an input multidimensional print intended use, an input available multidimensional printer, input available filaments, and an input maximum cost.

5. The method of claim 1, wherein the multidimensional print structure includes a 3D or 4D model.

6. The method of claim 5, further comprising:
    analyzing the shape and scale of the 3D or 4D model; and
    determining the impact of mechanical forces on at least one region of the 3D or 4D model.

7. The method of claim 6, wherein the selecting the at least one filament for the new multidimensional print includes the determined impact of the mechanical forces.

8. A computer program product for autonomous filament selection for multidimensional printers, the computer program product comprising:
    one or more computer-readable storage media and program instructions stored on one or more non-transitory computer-readable storage media capable of performing a method, the method comprising:
        obtaining multimedia associated with multidimensional prints and constituent filaments;
        analyzing the obtained multimedia to extract multidimensional print features, filament features, and user feedback for at least some of the multidimensional prints and at least some of the constituent filaments;
        mapping the extracted multidimensional print features, filament features, and user feedback into a multifactorial matrix;
        creating complex constellations of extracted features using the multifactorial matrix;
        training an associated autonomous multidimensional print filament selection model using the complex constellations; and
        generating, with the trained multidimensional print filament selection model, a ranked list of filaments, the ranked list including explanations of pros and cons associated with each filament; and
        selecting at least one filament for a new multidimensional print based on the ranked list of filaments and a plurality of user desired multidimensional print features.

9. The computer program product of claim 8, wherein the extracted multidimensional print features include at least one of a multidimensional printer type used, a multidimensional print category, a multidimensional print intended use, a multidimensional print structure, and a multidimensional print overall cost.

10. The computer program product of claim 8, wherein the extracted filament features include at least one of a constituent filament cost, requisite multidimensional printer types, a filament strength, a filament difficulty-of-use, a filament print temperature, a filament durability, a filament solubility, a filament food safety, and a filament color.

11. The computer program product of claim 8, wherein the user desired multidimensional print features include at least one of an input multidimensional print category, an input multidimensional print intended use, an input available multidimensional printer, input available filaments, and an input maximum cost.

12. The computer program product of claim 8, wherein the multidimensional print structure includes a 3D or 4D model.

13. The computer program product of claim 12, further comprising:
    analyzing the shape and scale of the 3D or 4D model; and
    determining the impact of mechanical forces on at least one region of the 3D or 4D model.

14. The computer program product of claim 13, wherein the selecting the at least one filament for the new multidimensional print includes the determined impact of the mechanical forces.

15. A computer system for autonomous filament selection for multidimensional printers, the computer system comprising:
    one or more computer processors, one or more computer-readable storage media, and program instructions stored on the one or more of the computer-readable storage media for execution by at least one of the one or more processors capable of performing a method, the method comprising:
obtaining multimedia associated with multidimensional prints and constituent filaments;
analyzing the obtained multimedia to extract multidimensional print features, filament features, and user feedback for at least some of the multidimensional prints and at least some of the constituent filaments;
mapping the extracted multidimensional print features, filament features, and user feedback into a multifactorial matrix;
creating complex constellations of extracted features using the multifactorial matrix;
training an associated autonomous multidimensional print filament selection model using the complex constellations; and
generating, with the trained multidimensional print filament selection model, a ranked list of filaments, the ranked list including explanations of pros and cons associated with each filament; and
selecting at least one filament for a new multidimensional print based on the ranked list of filaments and a plurality of user desired multidimensional print features.

16. The computer system of claim 15, wherein the extracted multidimensional print features include at least one of a multidimensional printer type used, a multidimensional print category, a multidimensional print intended use, a multidimensional print structure, and a multidimensional print overall cost.

17. The computer system of claim 15, wherein the extracted filament features include at least one of a constituent filament cost, requisite multidimensional printer types, a filament strength, a filament difficulty-of-use, a filament print temperature, a filament durability, a filament solubility, a filament food safety, and a filament color.

18. The computer system of claim 15, wherein the user desired multidimensional print features include at least one of an input multidimensional print category, an input multidimensional print intended use, an input available multidimensional printer, input available filaments, and an input maximum cost.

19. The computer system of claim 15, wherein the multidimensional print structure includes a 3D or 4D model.

20. The computer system of claim 19, further comprising:
analyzing the shape and scale of the 3D or 4D model; and
determining the impact of mechanical forces on at least one region of the 3D or 4D model.

* * * * *